United States Patent
Denz et al.

(10) Patent No.: US 6,918,367 B2
(45) Date of Patent: Jul. 19, 2005

(54) METHOD FOR STARTING AN INTERNAL COMBUSTION ENGINE, PARTICULARLY AN INTERNAL COMBUSTION ENGINE HAVING DIRECT FUEL INJECTION

(75) Inventors: Helmut Denz, Stuttgart (DE); Andreas Kufferath, Markgroeningen (DE); Martin Ludwig, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/756,688

(22) Filed: Jan. 12, 2004

(65) Prior Publication Data

US 2004/0182367 A1 Sep. 23, 2004

(30) Foreign Application Priority Data

Jan. 15, 2003 (DE) .......................................... 103 01 236

(51) Int. Cl.$^7$ .......................... F02M 37/18; F02M 17/00
(52) U.S. Cl. ................... 123/179.17; 123/491; 123/458
(58) Field of Search ................................ 123/478, 491, 123/497, 457, 458, 179.16, 179.17

(56) References Cited

U.S. PATENT DOCUMENTS

| | | | | |
|---|---|---|---|---|
| 5,572,964 A | * | 11/1996 | Cogneville et al. | .... 123/179.17 |
| 5,651,347 A | * | 7/1997 | Oi et al. | ...................... 123/487 |
| 5,842,454 A | * | 12/1998 | Miwa et al. | ................. 123/497 |
| 5,884,597 A | * | 3/1999 | Hiraku et al. | .......... 123/179.17 |
| 6,021,763 A | * | 2/2000 | Yoshihara et al. | .......... 123/516 |
| 6,073,597 A | * | 6/2000 | Harata et al. | .......... 123/179.14 |
| 6,276,340 B1 | * | 8/2001 | Kato | ........................... 123/491 |
| 6,408,822 B1 | * | 6/2002 | Rembold et al. | ........... 123/447 |
| 6,450,147 B2 | * | 9/2002 | Demura et al. | ............. 123/458 |

FOREIGN PATENT DOCUMENTS

DE 10014550 * 10/2001 .......... F02M/37/08

* cited by examiner

*Primary Examiner*—Thomas Moulis
(74) *Attorney, Agent, or Firm*—Kenyon & Kenyon

(57) ABSTRACT

During a start, particularly during a cold start, of an internal combustion engine without additional auxiliary drive, a precisely metered fuel mass is introduced into a combustion chamber. In the case of an internal combustion engine having direct fuel injection, a rail pressure prevailing in a high-pressure accumulator is frequently only insufficiently built up during a start, which has an unfavorable effect on the mixture formation. To improve the start performance of the internal combustion engine, the injection pressure available in the high-pressure accumulator is monitored during the start, and fuel from the high-pressure accumulator is first injected into the at least one combustion chamber when the injection pressure has reached or exceeded a specifiable threshold value. This ensures that the rail pressure is high enough, in order to inject a sufficient quantity of fuel into the combustion chamber so that an ignitable air/fuel mixture is formed.

14 Claims, 2 Drawing Sheets

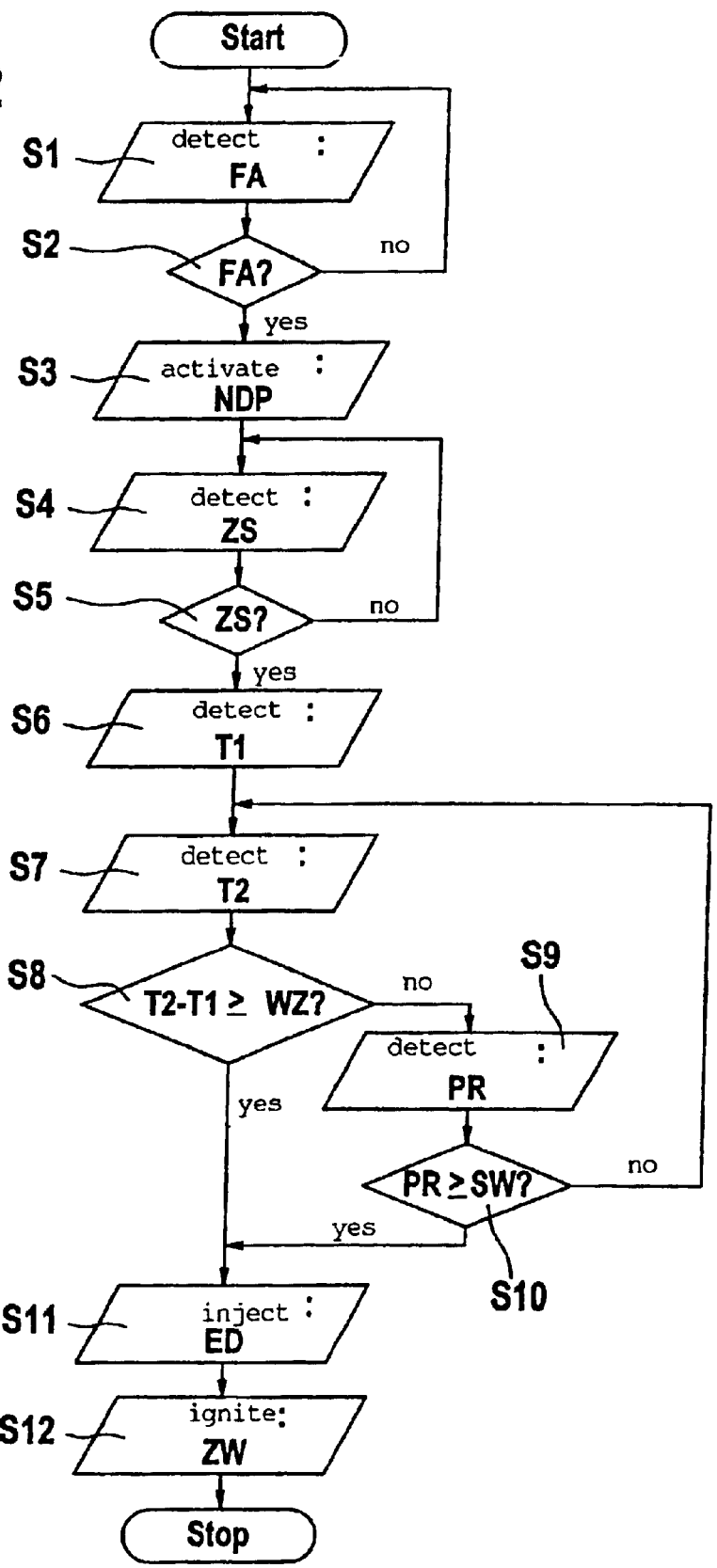

METHOD FOR STARTING AN INTERNAL COMBUSTION ENGINE, PARTICULARLY AN INTERNAL COMBUSTION ENGINE HAVING DIRECT FUEL INJECTION

FIELD OF THE INVENTION

The present invention relates to a method for starting an internal combustion engine, in which a starter switch for the internal combustion engine is actuated. After the starter switch is actuated, an injection pressure is built up in a high-pressure accumulator of the internal combustion engine. Fuel having the injection pressure available in the high-pressure accumulator is injected into at least one combustion chamber of the internal combustion engine.

Furthermore, the present invention relates to a control unit for controlling and/or regulating an internal combustion engine, particularly a high-pressure injection system of the internal combustion engine, and a computer program executable on a computing element, in particular on a microprocessor.

BACKGROUND INFORMATION

A method as described above is conventional. In a so-called common-rail fuel injection system, a fuel presupply pump delivers fuel from a fuel reservoir into a low-pressure region. A high-pressure pump then delivers the fuel from the low-pressure region into a high-pressure region. From there, the fuel is metered by controllable fuel injectors into the individual combustion chambers of the internal combustion engine. In conventional common-rail systems, the pressure in the high-pressure region, the so-called rail pressure, for gasoline direct-injection internal combustion engines is in a range between approximately 40 bar and several hundred bar, and for diesel direct-injection internal combustion engines reaches up to approximately 2000 bar.

A fuel mass introduced by the fuel injector into the combustion chamber is determined by an opening duration of the fuel injector and the rail pressure prevailing in the high-pressure region. During a start, particularly during a cold start, of the internal combustion engine, it is important that a precisely metered fuel mass be introduced into the combustion chamber. However, during a start, the rail pressure is frequently not yet completely built up, which has an unfavorable effect on the mixture formation in the combustion chamber. This is especially the case when the high-pressure pump is driven mechanically by a rotation of the internal combustion engine. In such a case, attempt is made with the aid of an electrically driven fuel presupply pump to generate a rail pressure, typically between 1 and 10 bar, which permits injection of a sufficient fuel mass into the combustion chamber.

However, the pressure generated by the fuel presupply pump may vary strongly between individual start phases, for example, caused by immobilization times of different lengths and different ambient temperatures. At very low temperatures, a lower battery voltage may cause an electrically driven fuel presupply pump to operate less effectively. At high temperatures in the fuel system, e.g., after switching off a vehicle having a hot internal combustion engine, a delayed pressure buildup may take place due to a formation of steam in the fuel system. The air/fuel mixtures thus formed in the combustion chamber may not be ignitable, which can lead to starting problems.

An object of the present invention is to improve the mixture formation of the air/fuel mixture needed for a start.

SUMMARY

In accordance with an example embodiment of the present invention, the injection pressure available in the high-pressure accumulator is monitored during the start. Fuel from the high-pressure accumulator is first injected into the at least one combustion chamber when the injection pressure has reached or exceeded a specifiable threshold value. This ensures that the rail pressure is high enough, in order to inject a sufficient quantity of fuel into the combustion chamber so that an ignitable mixture is formed.

In one advantageous further development of the present invention, a time elapsed since the actuation of the starter switch is monitored, and the fuel is injected into the at least one combustion chamber at the latest when the time has reached or exceeded a specifiable maximum waiting time. This ensures that even when the pressure prevailing in the high-pressure accumulator does not reach the specifiable threshold value within the predefined waiting time, a start is nevertheless attempted in order, to the greatest extent possible, to prevent a breakdown.

In one preferred example embodiment, a duration of an injection is determined as a function of the pressure prevailing in the high-pressure accumulator. Therefore, an ascertained rail pressure may be used to improve the air/fuel mixture formation. If the specifiable threshold value is not reached, then using the ascertained actual rail pressure, an ignitable mixture may be produced, for example, by lengthening the injection duration accordingly.

In a further advantageous development, an electrically actuatable presupply pump is activated for building up the injection pressure in the high-pressure accumulator. In a direct-start method without additional auxiliary drive, the internal combustion engine stands completely still until a first ignition of an air/fuel mixture. For a direct-start method without additional auxiliary drive, this development of the present invention has the advantage that the injection pressure may be generated independently of the speed of the internal combustion engine.

The buildup of the injection pressure in the high-pressure accumulator of the internal combustion engine is advantageously begun as a function of a driver-present signal. A driver-present signal here designates a signal capable of indicating whether actuation of the starter switch is to be expected in the foreseeable time. In this context, the starting point is that an actuation of the starter switch within the foreseeable time may be assumed when a driver is in the vehicle and the vehicle is switched off. In particular, the existence of a driver-present signal makes it possible to already activate the fuel presupply pump prior to an actuation of the starter switch. More time thereby remains until an actual start attempt, so that a higher rail pressure may be built up. This increases starting reliability.

In one preferred example embodiment, the driver-present signal is generated by a door contact switch. This makes it possible to generate a driver-present signal in a particularly cost-effective manner.

In a further preferred example embodiment, the driver-present signal is generated by a sensor for detecting occupancy of the driver's seat. This allows a particularly reliable judgment as to whether a driver is in the vehicle.

The present invention also includes a control unit for controlling and/or regulating an internal combustion engine, particularly a high-pressure injection system of the internal combustion engine, the control unit monitoring an injection pressure available in a high-pressure accumulator of the high-pressure injection system during a start of the internal combustion engine, and only inducing an injection of fuel from the high-pressure accumulator into at least one combustion chamber of the internal combustion engine when the injection pressure has reached or exceeded a specifiable threshold value.

In one advantageous further development, the control unit monitors a time elapsed since the actuation of the starter switch, and induces an injection of fuel into the at least one combustion chamber at the latest when the time has reached or exceeded a specifiable maximum waiting time.

In one preferred specific embodiment of the control unit, the control unit is provided with an arrangement for carrying out a method of the present invention.

In addition, implementation of the present invention in the form of a computer program may be important. In this context, the computer program is executable on a computing element, particularly on a microprocessor of a control unit for controlling and/or regulating an internal combustion engine, and is suitable for carrying out the method of the present invention. The present invention is thus realized by the computer program, so that this computer program represents the present invention in the same way as the method, for whose implementation the computer program is suitable. The computer program is preferably stored on a memory element. In particular, a random-access memory, a read-only-memory or a flash memory may be used as memory element.

BRIEF DESCRIPTION OF THE DRAWINGS

Additional features, possible applications and advantages of the present invention are derived from the following description of exemplary embodiments of the present invention, which are illustrated in the drawing. In this context, all of the described or represented features, by themselves or in any combination, form the subject matter of the present invention regardless of their formulation and representation in the specification and drawings, respectively.

FIG. 2 shows a flowchart of an example method according to the present invention for starting an internal combustion engine, in which injection of fuel into a combustion chamber is delayed either until a specifiable threshold value for the rail pressure is reached or a specifiable time duration is exceeded.

DETAILED DESCRIPTION OF EXAMPLE EMBODIMENTS

Figure 1:
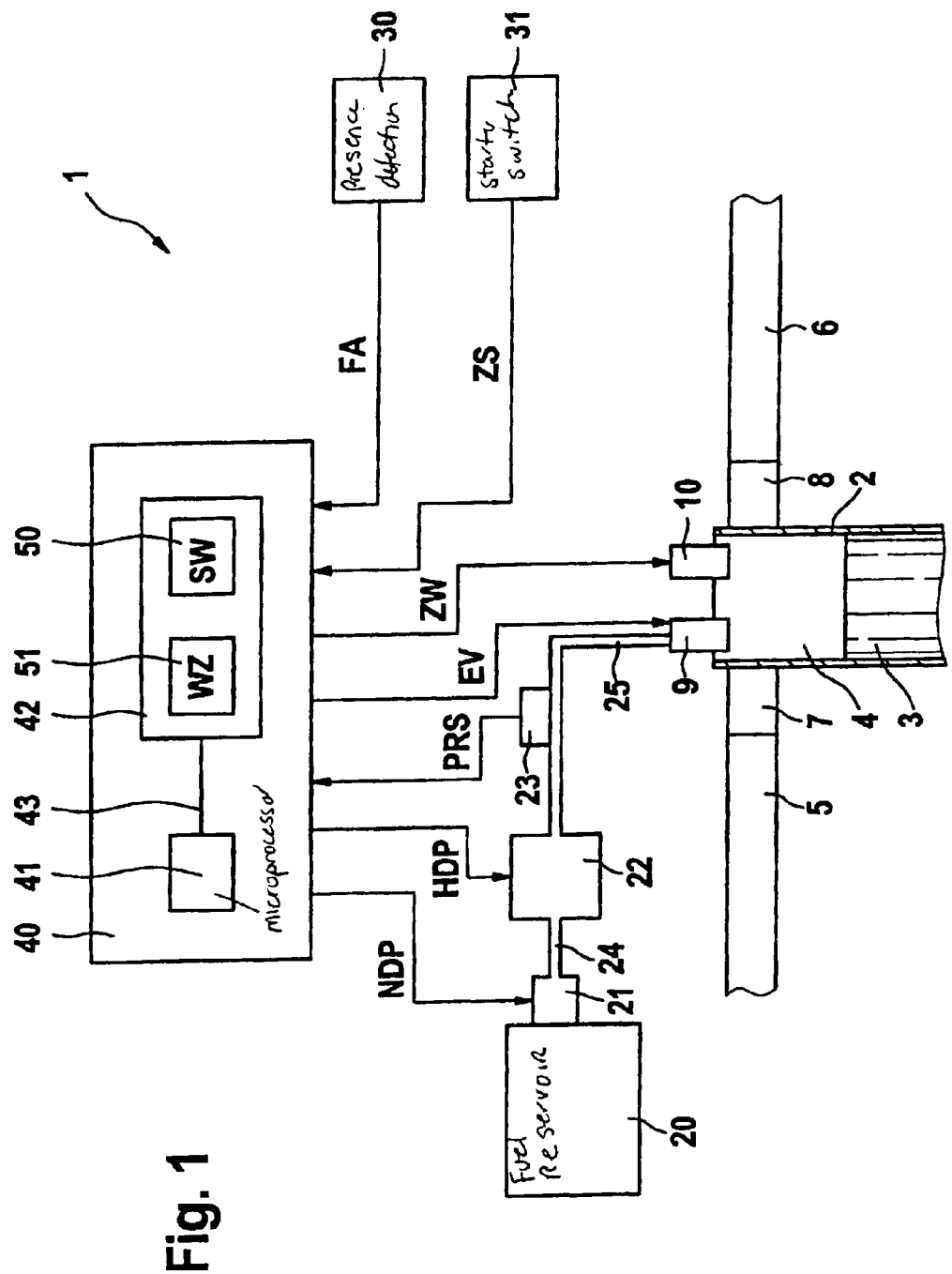
FIG. 1 shows a schematic representation of an internal combustion engine having a control unit and a greatly simplified common-rail injection system.

FIG. 1 shows an internal combustion engine 1 in which a piston 3 is arranged in a manner allowing it to move back and forth in a cylinder 2. Naturally, internal combustion engine 1 may also include a plurality of cylinders 2. Formed in cylinder 2 is a combustion chamber 4, to which an intake manifold 5 is connected via an intake valve 7, and an exhaust pipe 6 is connected via an exhaust valve 8. Also allocated to combustion chamber 4 are a fuel injector 9 controllable by a signal EV and a spark plug 10 controllable by a signal ZW.

Mounted at a fuel reservoir 20 is a fuel presupply pump 21 that is controllable via a signal NDP and is preferably electrically driven. It is connected via a fuel line 24 to a high-pressure pump 22 controllable via a signal HDP. A high-pressure accumulator 25 connects fuel injector 9 to high-pressure pump 22. Arranged in high-pressure accumulator 25 is a pressure sensor 23 that generates a signal PRS as a function of a pressure PR prevailing in high-pressure accumulator 25.

The signals described above are supplied to or generated by a control unit 40 for controlling and/or regulating an internal combustion engine 1. Control unit 40 includes a microprocessor 41 connected to a memory element 42 via a bus system 43. A waiting time WZ is stored in memory element 42 in a memory area 51, and a pressure setpoint value SW is stored in a memory area 50.

A signal ZS is generated via a starter switch 31, that, for example, designates so-called terminal 15 and may be designed as an ignition switch or starter button, and is supplied to control unit 40. In addition, reference numeral 30 designates a device which detects the presence of a driver and, as a function thereof, generates a driver-present signal FA and supplies it to control unit 40. This device 30 may be designed, for example, so that opening of the driver's door or occupancy of the driver's seat is detected.

An ignitable air/fuel mixture is produced in combustion chamber 4 of internal combustion engine 1 during a regular operation of internal combustion engine 1 in the following manner:

An air flow reaches combustion chamber 4 via intake manifold 5 and intake valve 7. Fuel is supplied from fuel reservoir 20 by fuel presupply pump 21 via fuel line 24 to high-pressure pump 22. A pressure of approximately 1–10 bar typically prevails in fuel line 24 in the low-pressure region. High-pressure pump 22 then raises the low pressure to an injection pressure PR in high-pressure accumulator 25. Injection pressure PR may be up to several hundred bar for gasoline direct-injection internal combustion engines and up to 2000 bar for diesel direct-injection internal combustion engines. The fuel is supplied under this pressure via high-pressure accumulator 25 to fuel injector 9. By way of signal EV, control unit 40 induces fuel injector 9 to open, so that the fuel arrives in combustion chamber 4 and mixes there with the existing air. Using signal ZW, control unit 40 then induces spark plug 10 to generate a spark, and thus the air/fuel mixture in combustion chamber 4 is ignited.

An instantaneous injection pressure PR in high-pressure accumulator 25 is ascertained in control unit 40 based on signal PRS generated by pressure sensor 23. The injection pressure is also known as rail pressure PR. As a function of ascertained rail pressure PR, control unit 40 controls high-pressure pump 22 using signal HDP and thus regulates pressure PR. Additionally or alternatively, it is possible for the fuel injection system to have a pressure control valve (not shown), via which fuel is able to get from high-pressure accumulator 25 back into fuel reservoir 20. Control unit 40 is able to trigger the pressure control valve to alter rail pressure PR.

During a direct start, particularly a cold start of internal combustion engine 1 without additional auxiliary drive (starter or starter generator), it is possible that pressure PR in high-pressure accumulator 25 will be too low to inject a sufficient quantity of fuel into combustion chamber 4 and therefore to produce an ignitable air/fuel mixture. For example, if high-pressure pump 22 is driven mechanically by a rotation of internal combustion engine 1, then generated pressure PR is a function of a speed of internal combustion engine 1. However, internal combustion engine 1 rotates only with very low speed during the start. In a direct-start method without additional auxiliary drive, internal combustion engine 1 even stands completely still until a first ignition of an air/fuel mixture.

However, it is precisely in a direct-start method that it may be important for a first ignition of the air/fuel mixture located in a combustion chamber 4 to generate sufficient energy so that start-up of internal combustion engine 1 is ensured. In order to be able to generate a pressure PR in fuel high-pressure accumulator 25 which is necessary for sufficient mixture formation, particularly for an adequate mixture of the air and the injected fuel, fuel presupply pump 21 is electrically driven, so that it is independent of the speed of internal combustion engine 1. Electric fuel pump 21 is designed, for example, so that it is able to generate pressures up to approximately 10 bar.

According to the present invention, the injection of fuel into combustion chamber 4 during the start is delayed until a sufficiently great pressure PR is built up and an ignitable air/fuel mixture can be produced in combustion chamber 4. Only after that is the air/fuel ratio ignited.

If, during a standstill of internal combustion engine 1, control unit 40 recognizes, e.g., via a device 30, the presence of a driver, then using signal NDP, it induces fuel presupply pump 21 to build up a pressure in high-pressure accumulator 25. Device 30 for recognizing a presence of a driver may be, for instance, a door contact switch or a sensor which detects whether a driver has been seated on the driver's seat. In this way, it is possible to begin building up an injection pressure before the driver has even actuated starter switch 31.

If, at this point, control unit 40 detects a signal ZS, generated by starter switch 31, which indicates a desire of the driver to start, then control unit 40 causes the injection of fuel into combustion chamber 4 to be delayed until the pressure PR, ascertained by pressure sensor 23, has reached or exceeded a specifiable threshold value SW stored in memory area 50 of memory element 42. However, if the duration of the pressure buildup exceeds a specifiable waiting time WZ stored in memory area 51 of memory element 42, then fuel is injected into combustion chamber 4 and an attempt is made to start even if pressure threshold value SW is not yet quite reached. In such a case, it is assumed that threshold value SW will no longer be reached at all or at least not for the foreseeable time.

The example method of the present invention for starting internal combustion engine 1 is clarified with reference to the flowchart shown in simplified manner in FIG. 2.

The method begins, for example, when internal combustion engine 1 is standing still. In step S1, signal FA which describes whether a driver is in the vehicle is detected via device 30. In a query step S2, this signal FA is evaluated, for example, starting from the assumption that in response to the presence of a driver, signal FA supplies a value that is greater than 0. If no driver is present (FA=0), then there is a branch back to step S1. If a driver is present (FA>0), then in a step S3, signal NDP is generated which activates fuel presupply pump 21 and the buildup of pressure PR in high-pressure accumulator 25 is begun. In a step S4, a signal ZS generated by starter switch 31 is detected, and in a query step S5, it is checked whether starter switch 31 was actuated. If this is not the case, there is a return to step S4, and a pressure PR continues to be built up by fuel presupply pump 21.

However, if starter switch 31 was actuated, then in a step S6, an initial time T1 is determined and in a step S7, an instantaneous time T2 is determined. In a query step S8, based on the difference T2−T1, a time duration is calculated and it is checked whether this is greater than or equal to specifiable waiting time WZ. Variable WZ describes the maximum waiting time during which control unit 40 waits for a sufficiently great pressure PR to be generated in high-pressure accumulator 25 by fuel presupply pump 21. If this waiting time WZ is not exceeded, then in a step S9, instantaneous rail pressure PR is detected, and in a step S10, it is checked whether it has already reached or exceeded specifiable threshold value SW. If this is not the case, there is a return to step S7.

However, if it is determined in step S8 that waiting time WZ is exceeded, or it is determined in query step S10 that instantaneous rail pressure PR has reached or exceeded specifiable threshold value SW, then the method is continued in a step S11. There, with the aid of signal EV, fuel injector 9 is induced to introduce fuel into combustion chamber 4 and consequently to produce an air/fuel mixture. In a step S12, signal ZW then induces spark plug 10 to ignite the air/fuel mixture, whereupon the example method comes to an end.

What is claimed is:

1. A method for starting an internal combustion engine, comprising:

actuating a starter switch for the internal combustion engine;

after the starter switch is actuated, building up an injection pressure in a high-pressure accumulator of the internal combustion engine;

monitoring the injection pressure available in the high-pressure accumulator during the start; and first injecting fuel from the high-pressure accumulator into at least one combustion chamber of the internal combustion chamber when the injection pressure has reached or exceeded a specifiable threshold value.

2. The method as recited in claim 1, further comprising:

monitoring a time elapsed since the actuation of the starter switch, where the fuel is first injected into the at least one combustion chamber at the latest when the time has reached or exceeded a specifiable maximum waiting time.

3. The method as recited in claim 2, determining a duration of an injection during the start as a function of the pressure prevailing in the high-pressure accumulator.

4. The method as recited in claim 1, further comprising:

activating an electrically actuatable presupply pump for building up the injection pressure in the high-pressure accumulator.

5. The method as recited in claim 1, wherein the buildup of the injection pressure in the high-pressure accumulator of the internal combustion engine is begun as a function of a driver-present signal.

6. The method as recited in claim 5, wherein the driver-present signal is generated by a door contact switch.

7. The method as recited in claim 5, wherein the driver-present signal is generated by a sensor for detecting occupancy of the driver's seat.

8. A control unit for at least one of controlling and regulating a high-pressure injection system of an internal combustion engine, comprising:

an arrangement configured to monitor an injection pressure available in a high-pressure accumulator of the high-pressure injection system during a start of the internal combustion engine; and an arrangement configured to first induce an injection of fuel from the high-pressure accumulator into at least one combustion chamber of the internal combustion engine when the injection pressure has reached or exceeded a specifiable threshold value.

9. The control unit as recited in claim 8, further comprising:

an arrangement that monitors a time elapsed since the actuation of the starter switch, and induces an injection of fuel into the at least one combustion chamber at the latest when the time has reached or exceeded a specifiable maximum waiting time.

10. The control unit as recited in claim 9, further comprising:

an arrangement configured to determine a duration of an injection during the start as a function of a pressure prevailing in the high-pressure accumulator.

11. A computer readable medium coded with a computer program that is executable on a computing element for causing the computing element to implement a method for starting an internal combustion engine when the computer program is executed by the computing element, the method comprising:

actuating a starter switch for the internal combustion engine;

after the starter switch is actuated, building up an injection pressure in a high-pressure accumulator of the internal combustion engine;

monitoring the injection pressure available in the high-pressure accumulator during the start; and first injecting fuel from the high-pressure accumulator into at least one combustion chamber of the internal combustion chamber when the injection pressure has reached or exceeded a specifiable threshold value.

12. The computer readable medium as recited in claim 11, wherein the medium is one of a RAM (random-access memory), ROM (read-only memory), or a flash memory.

13. A method for starting an internal combustion engine, comprising:

actuating a starter switch for the internal combustion engine;

after the starter switch is actuated, building up an injection pressure in a high-pressure accumulator of the internal combustion engine;

monitoring the injection pressure available in the high-pressure accumulator during the start;

first injecting fuel from the high-pressure accumulator into at least one combustion chamber of the internal combustion chamber when the injection pressure has reached or exceeded a specifiable threshold value; and determining a duration of an injection during the start as a function of the pressure prevailing in the high-pressure accumulator.

14. A control unit for at least one of controlling and regulating a high-pressure injection system of an internal combustion engine, comprising:

an arrangement configured to monitor an injection pressure available in a high-pressure accumulator of the high-pressure injection system during a start of the internal combustion engine;

an arrangement configured to first induce an injection of fuel from the high-pressure accumulator into at least one combustion chamber of the internal combustion engine when the injection pressure has reached or exceeded a specifiable threshold value; and an arrangement configured to determine a duration of an injection during the start as a function of a pressure prevailing in the high-pressure accumulator.

* * * * *